(12) United States Patent
Hampton et al.

(10) Patent No.: US 10,746,888 B2
(45) Date of Patent: Aug. 18, 2020

(54) MICROSEISMIC DENSITY MAPPING

(71) Applicant: HALLIBURTON ENERGY SERVICES, INC., Houston, TX (US)

(72) Inventors: Jesse Clay Hampton, Conroe, TX (US); Luis Alexander Matzar, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 623 days.

(21) Appl. No.: 15/521,758

(22) PCT Filed: Nov. 24, 2014

(86) PCT No.: PCT/US2014/067015
§ 371 (c)(1),
(2) Date: Apr. 25, 2017

(87) PCT Pub. No.: WO2016/085442
PCT Pub. Date: Jun. 2, 2016

(65) Prior Publication Data
US 2017/0242140 A1    Aug. 24, 2017

(51) Int. Cl.
| | |
|---|---|
| *G01V 1/28* | (2006.01) |
| *G01V 1/40* | (2006.01) |
| *G01V 1/50* | (2006.01) |
| *E21B 47/12* | (2012.01) |
| *E21B 47/00* | (2012.01) |
| *E21B 43/26* | (2006.01) |

(Continued)

(52) U.S. Cl.
CPC .............. *G01V 1/288* (2013.01); *E21B 43/26* (2013.01); *E21B 47/0005* (2013.01);
(Continued)

(58) Field of Classification Search
CPC ...................................................... G01V 1/288
See application file for complete search history.

(56) References Cited

U.S. PATENT DOCUMENTS 10,401,512 B1 *  9/2019  Meek ....................... G01V 1/50
2005/0190649 A1  9/2005  Eisner et al.
(Continued)

FOREIGN PATENT DOCUMENTS

| CA | 2779996 | 12/2012 |
|---|---|---|
| CA | 2815906 | 12/2013 |

(Continued)

OTHER PUBLICATIONS

PCT International Search Report and Written Opinion, dated Aug. 18, 2015, Appl No. PCT/US14/67015, "Microseismic Density Mapping," Filed Nov. 24, 2014, 15 pgs.
(Continued)

*Primary Examiner* — Manuel A Rivera Vargas
(74) *Attorney, Agent, or Firm* — John W. Wustenberg; Parker Justiss, P.C.

(57) ABSTRACT

Methods and mediums for estimating stimulated reservoir volumes are disclosed. Some method embodiments may include obtaining microseismic event data acquired during a hydraulic fracturing treatment of the formation, the data including event location and at least one additional attribute for each microseismic event within the formation; filtering the microseismic events based on the at least one additional attribute; determining a density of filtered microseismic events; weighting the filtered microseismic events based on the density; and determining a stimulated reservoir volume estimate based on filtered and weighted microseismic events.

20 Claims, 6 Drawing Sheets

(51) Int. Cl.
*E21B 49/00* (2006.01)
*G01V 1/42* (2006.01)

(52) U.S. Cl.
CPC ............ *E21B 47/123* (2013.01); *E21B 49/00* (2013.01); *G01V 1/40* (2013.01); *G01V 1/42* (2013.01); *G01V 1/50* (2013.01); *G01V 2210/123* (2013.01); *G01V 2210/1234* (2013.01); *G01V 2210/6122* (2013.01); *G01V 2210/6224* (2013.01)

(56) References Cited

U.S. PATENT DOCUMENTS

| | | |
|---|---|---|
| 2008/0259727 A1 | 10/2008 | Drew |
| 2011/0137568 A1 | 6/2011 | Bradley et al. |
| 2012/0243368 A1 | 9/2012 | Geiser et al. |
| 2014/0303896 A1 | 10/2014 | Wrobel et al. |

FOREIGN PATENT DOCUMENTS

| | | |
|---|---|---|
| WO | 2005/106533 | 11/2005 |
| WO | 2012/054487 | 4/2012 |

OTHER PUBLICATIONS

Hampton, J. C. et al., "Cumulative Volumetric Deformation of a Hydraulic Fracture using Acoustic Emission and Micro-CT Imaging," The American Rock Mechanics Association, Rock Mechanics/ Geomechanics Symposium Brochure, ARMA-2014-7041, Jun. 1-4, 2014.

* cited by examiner

MICROSEISMIC DENSITY MAPPING

BACKGROUND

Oilfield drilling, stimulation, and production activities often cause microseismic events due to compacting rock, propagating fractures, or relieving of shear stress. For example, drillers may perform a hydraulic fracturing operation in which a fluid is injected into a borehole under high pressure to enlarge any existing fractures in the formation and to create new fractures. The injected fluid often carries entrained particulate matter to be deposited in the fractures, thereby propping them open when the pressure returns to normal. Such fractures substantially increase the permeability of the formation, which makes it easier for fluid to flow from the formation into the borehole.

Microseismic events from the hydraulic fracturing operation cause pressure and/or shear waves to propagate outward in all directions away from the events. Receivers up to a kilometer away have been used to detect and locate such microseismic events in rock types such as unconsolidated sands, chalks, and crystalline rocks by sensing the waves. The spatial distribution of microseismic events may be used to determine information about the chemical, hydraulic, and/or mechanical processes occurring in the in the earth.

The economic success of hydrocarbon extraction is heavily dependent on fracture complexity and subsurface insight with regards to pay zones. As such, oilfield operators employ models to predict the effects of a fracturing operation and, in some cases, employ micro-seismic detection to gather data for the models. One of the primary uses of microseismic data is determining the fracture geometry and providing an estimation of stimulated reservoir volume (SRV). SRV is the total volume of rock which has been fractured and is presumed to be permeably connected to the borehole. Because of the complexity of measuring SRV in a heterogeneous formation, SRV estimates can vary widely. As such, decisions based on SRV, which include the economic feasibility of extraction, may have an undesirably high uncertainty.

BRIEF DESCRIPTION OF THE DRAWINGS

Accordingly, there are disclosed herein methods, systems, and software for microseismic density mapping. In the following detailed description of the various disclosed embodiments, reference will be made to the accompanying drawings in which.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

Notation and Nomenclature

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

Figure 1:
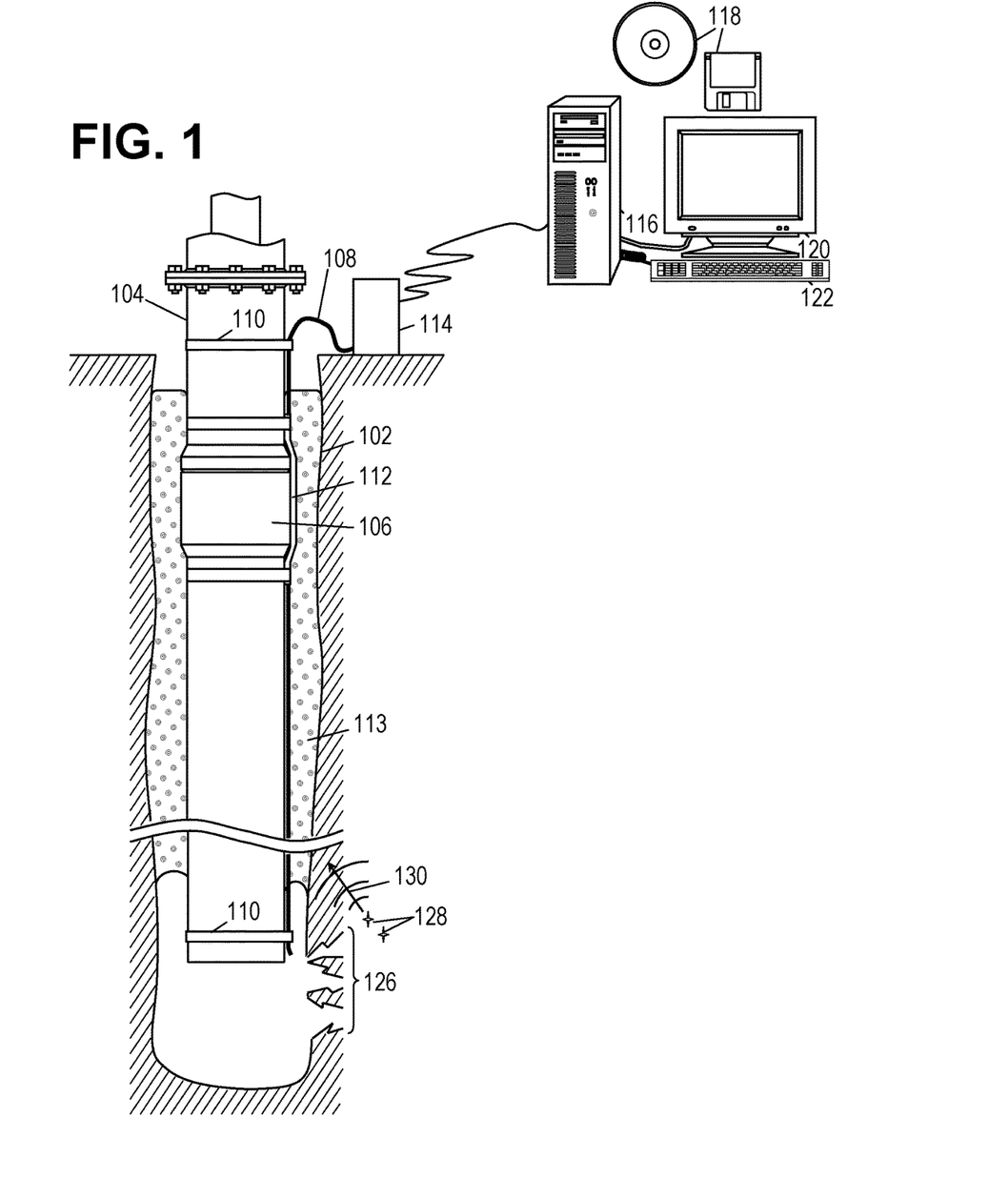
FIG. 1 is a cross-sectional view of an illustrative borehole with a monitoring system capable of collecting raw microseismic data.

The issues identified in the background are at least partly addressed by microseismic density mapping. To illustrate a context for the disclosed methods, systems, and mediums, FIG. 1 shows an illustrative borehole 102 that has been drilled into the earth. Such a borehole may be drilled to ten thousand feet or more in depth and may be steered horizontally for more than twice that distance. During the drilling process, the driller circulates a drilling fluid to clean cuttings from the bit and carry them out of the borehole 102. In addition, the drilling fluid is normally formulated to have a desired density and weight to approximately balance the pressure of native fluids in the formation. Thus, the drilling fluid itself can at least temporarily stabilize the borehole 102 and prevent blowouts.

To provide a more permanent solution, the driller inserts a casing string 104 into the borehole. The casing string 104 is normally formed from lengths of tubing joined by threaded tubing joints 106. The driller connects the tubing lengths together as the casing string 104 is lowered into the borehole 102. During this process, the drilling crew can also attach a fiber optic cable 108 and/or an array of sensors to the exterior of the casing with straps 110 or other mounting mechanisms. Because the tubing joints 106 have raised profiles, cable protectors 112 may be employed to guide the cable 108 over the joints and protect the cable from getting pinched between the tubing joints 106 and the borehole 102 wall.

Once the casing string 104 has been placed in the desired position, the drilling crew may inject a cement 113 slurry that flows into the annulus around the casing and sets to seal the casing to the formation. The cement 113 also provides acoustic coupling between the fiber optic cable(s) 108 and the formation. The cable(s) are trimmed and attached to a measurement unit 114. The measurement unit 114 supplies laser light pulses to the cable(s) and analyzes the returned signal(s) to perform distributed sensing of one or more microseismic events and additional attributes of microseismic events. The additional attributes of a microseismic event may include an amplitude, location error, volume, volume change, energy, frequency, and/or mode of failure associated with the event.

A data processing system 116 may periodically obtain data from the measurement unit 114 as a function of position and/or time. Software (represented by information storage media 118) may run on the data processing system 116 to collect the data and organize it in a file or database. The software 118 may respond to user input via a keyboard or other input mechanism 122 to display data as an image or movie on a monitor or other output mechanism 120. The software 118 may process the data to identify individual microseismic events. Such information is useful for tracking the progress of hydraulic fracture jobs, in which this borehole 102 or another nearby borehole has perforations 126 through which a fluid is pumped into the formation to widen and extend existing fractures and create new fractures. As such fractures open and move, they cause microseismic events 128 that cause elastic waves 130 to propagate through the formation. As such waves propagate, they encounter the borehole 102 and the sensors 108 in a manner that enables data collection and processing.

Figure 2:
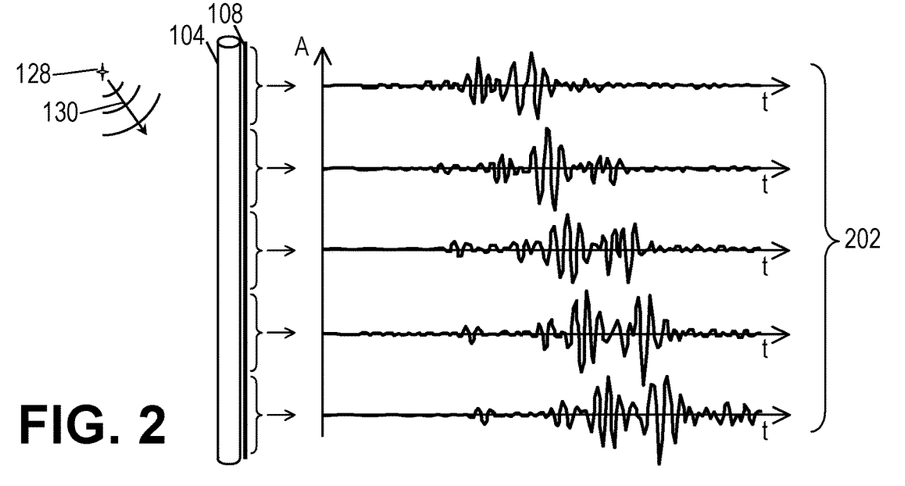
FIG. 2 is a diagram showing the detection of an illustrative microseismic event.

FIG. 2 illustrates seismic waves 130 propagating outwards from a microseismic event 128. As the waves 130 travel to the casing string 104 and interact with the fiber optic cable 108 or other sensor, they induce changes in the intensity of Rayleigh-backscatter reflections that the measurement unit translates into seismic signals 202 that correspond to various positions along the casing string. Note that the seismic signals 202 for different positions exhibit a time shift in accordance with the propagation time from the event 128 to the corresponding position in the fiber optic cable 108. The nearer portions of the fiber optic cable 108 detect the seismic wave sooner than the farther portions. Array processing is a technique that exploits the difference in time shifts that would be expected for different event locations. The seismic signals are digitized, stored, and communicated for processing by software that extracts the microseismic event information.

One illustrative array processing method is that of calculating similarity between the various seismic signals as a function of one or more parameters relating to location of a microseismic event. Suitable similarity measures include cross-correlation (with cross-covariance as a special case) and semblance. The cross-correlation coefficient of two signals can be expressed as:

$$c(\tau, m) = \sum_{t=mT}^{(m+1)T} s_1(t) s_2(t-\tau) \bigg/ \sqrt{\sum_{t=mT}^{(m+1)T} s_1^2(t)} \sqrt{\sum_{t=mT}^{(m+1)T} s_2^2(t-\tau)} \quad (1)$$

where $s_1(t)$ and $s_2(t)$ are the signals across a sequence of time windows of width T, m is time window index, and $\tau$ is a speculative time shift between the two signals. The value of $\tau$ that maximizes the correlation coefficient is often called the time lag between the two signals, and it also corresponds to the time shift that minimizes the mean square error between the normalized signals. For more than two signals, a pairwise cross-correlation may be determined for every pair of signals and the systematic variation of time lags may be analyzed to find the model parameters that provide the best fit. For example, a plane wave detected by evenly spaced (and sequentially numbered) sensing stations might be expected to yield signals having a systematic time lag variation of $n\Delta t$, where n is the difference between the station numbers.

The semblance coefficient for a set of N signals can be expressed as:

$$e(\tau, m) = \sum_{t=mT}^{(m+1)T} \left[ \sum_{n=1}^{N} s_n(t-n\tau) \right]^2 \bigg/ N \sum_{n=1}^{N} \sum_{t=mT}^{(m+1)T} s_n^2(t-n\tau) \quad (2)$$

where $s_n(t)$ are the signals from N sequentially numbered sensing stations n across a sequence of time windows of width T, m is time window index, and $\tau$ is a time shift between signals from adjacent stations. The value of $\tau$ that maximizes the semblance coefficient (or alternatively, that maximizes the average cross-correlation coefficient) is indicative of a plane wave's incidence direction.

Where v is the propagation velocity of seismic waves through the formation around a borehole, d is the interstation spacing, and $\theta$ is the incidence angle (i.e., the angle between the plane wave's normal and the borehole axis), the expected time lag between signals from adjacent stations can be expressed as:

$$\tau = \frac{d}{v} \cos\theta \quad (3)$$

thereby enabling a straightforward mapping of time lag to incidence angle. The presence or absence of a microseismic event can be determined by comparing the semblance coefficient or average cross-correlation coefficient to a threshold.

Figure 3:
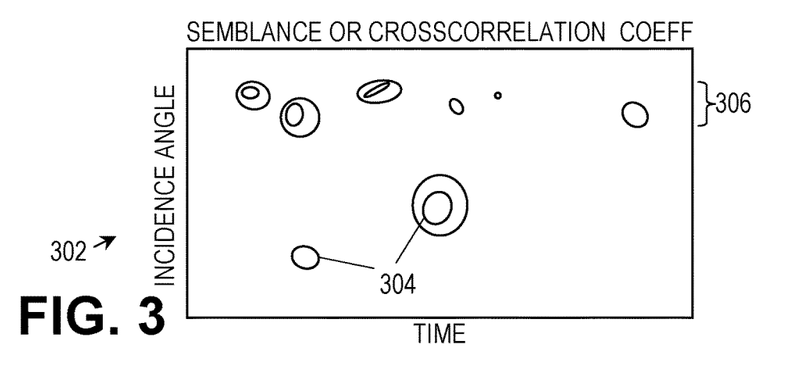
FIG. 3 is an illustrative graph of semblance versus time and incidence angle.

FIG. 3 shows a plot of semblance coefficient value (or average cross-correlation coefficient value) 302 as a function of incidence angle (vertical axis) and time window (horizontal axis). Colors or contour lines can be used to indicate coefficient values, making microseismic events readily apparent as peaks 304 in the plot. Such plots can also reveal patterns such as a series of events 306 at relatively consistent direction, perhaps indicating the propagation of a particular fracture.

Figure 4:
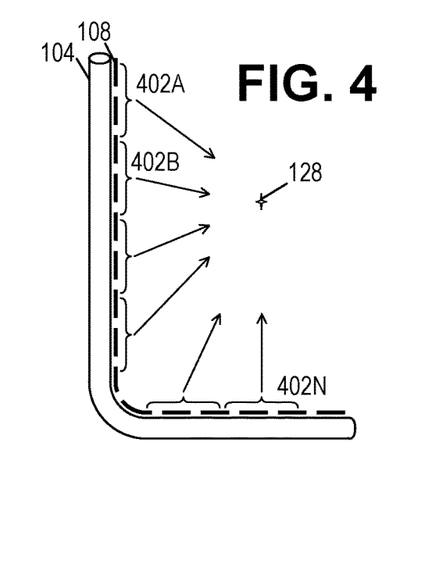
FIG. 4 is a cross-sectional view of an illustrative L-shaped borehole used to facilitate microseismic event triangulation.

As shown in FIG. 4, a large array of sensing stations can be subdivided into sub-arrays 402A-402N, e.g., groups of eight or sixteen sensing stations. The foregoing processing techniques can be used on the signals from each sub-array to determine corresponding incidence angles which can then be used to triangulate the location of one or more microseismic events 128. Accordingly, FIG. 4 shows the fiber-optic cable 108 extending in an L-shape that provides vertical and horizontal sub-arrays to eliminate any azimuthal ambiguity during triangulation. However, other multi-dimensional paths can be used to enable triangulation to a unique point. Alternatively, two or more vertical wells can be used to provide additional triangulation information. Yet another way to reduce or eliminate azimuthal ambiguity would be to employ additional sensors capable of providing azimuthal sensitivity, such as accelerometers or geophones.

Figure 5:
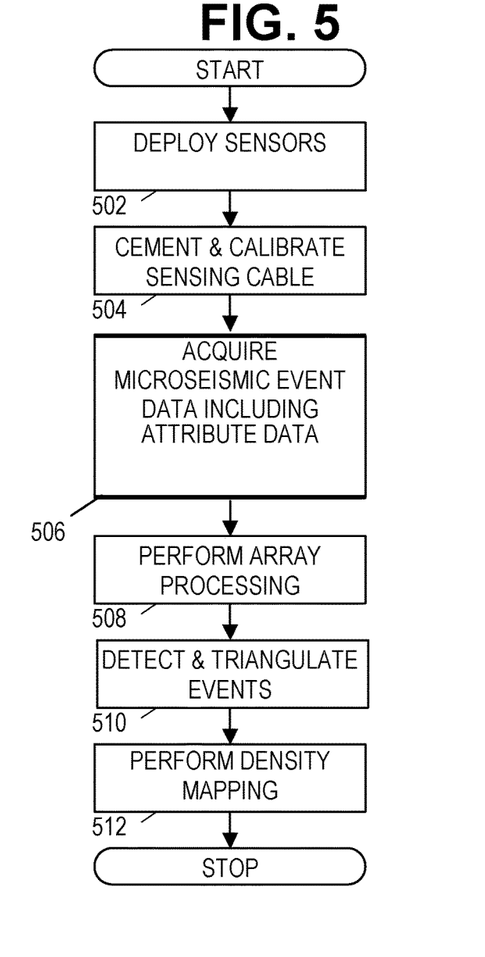
FIG. 5 is a flow diagram of an illustrative microseismic event data collection method in preparation for microseismic density mapping.

FIG. 5 is a flow diagram of an illustrative microseismic event data collection method in preparation for density mapping. Beginning at 502, a fiber optic cable or other sensor is deployed along a borehole. As described above, the cable or sensor array may be mounted to a casing string, but alternative embodiments include a "pumpable" sensor cable that is carried into place by the cement slurry itself. Alternatively, or in addition, the fiber optic cable may be embedded in a wireline that is lowered inside the casing, where borehole fluid provides acoustic coupling to the casing and formation. In at least one embodiment, sensors such as geophones may be deployed in a distributed fashion over the earth's surface.

At 504, the cable is fixed in place, either by setting of the cement slurry or anchoring of the downhole terminus. If desired, the path of the cable can be ascertained using a calibration technique such as a surface shot or a wireline run with an acoustic source.

At 506, microseismic event data, including additional attribute data, is acquired. For example, the sensor array may detect or sense microseismic signals, process the signals to form microseismic data, and a measurement unit may acquire the data from the sensor array. The data may be obtained from the measurement unit by one or more computers for array processing at 508, e.g., cross-correlation coefficient calculations, semblance coefficient calculations, or the like. At 510, the computers compare the received array-processing results to thresholds to detect and triangulate the microseismic events within the formation. In at least one embodiment, no additional attribute data is used to detect and triangulate the microseismic events. The computers may provide a display of results and/or detected microseismic event information, such as the plot of FIG. 6, to a user interface. At 512, density mapping is performed using the additional attribute data as described below.

Figure 6:
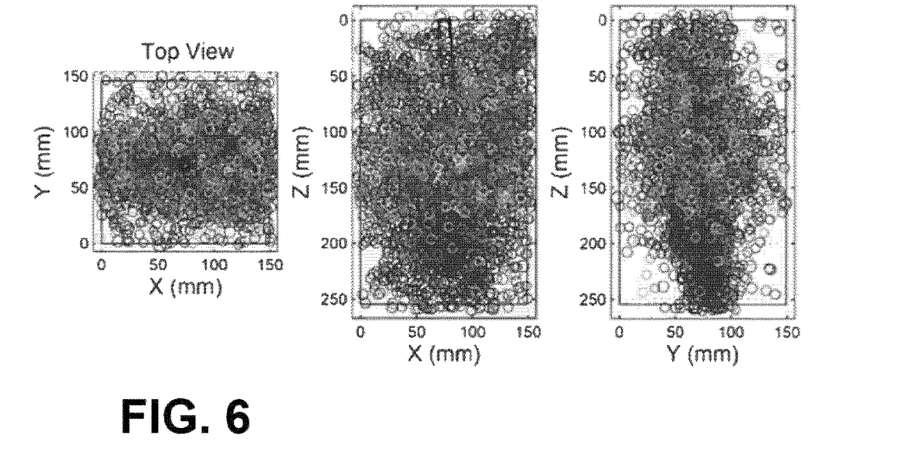
FIG. 6 is a plot of illustrative microseismic event locations.

FIG. 6 illustrates the location of microseismic events within a formation using a top view, front view, and side view. Each circle represents a microseismic event around a borehole which is centered in each view. As illustrated, using only location data (not additional attribute data), it is unclear whether or not the entire formation depicted will be productive and should be included in the stimulated reservoir volume. For example, one or more areas within the depicted region may contribute substantially more to production than other areas. If these regions can be identified, the stimulated reservoir volume determination can be made with increased precision leading to lower-risk decisions that are based on the stimulated reservoir volume such as the economic feasibility of extraction. Microseismic density mapping allows these regions to be identified.

Figure 7:
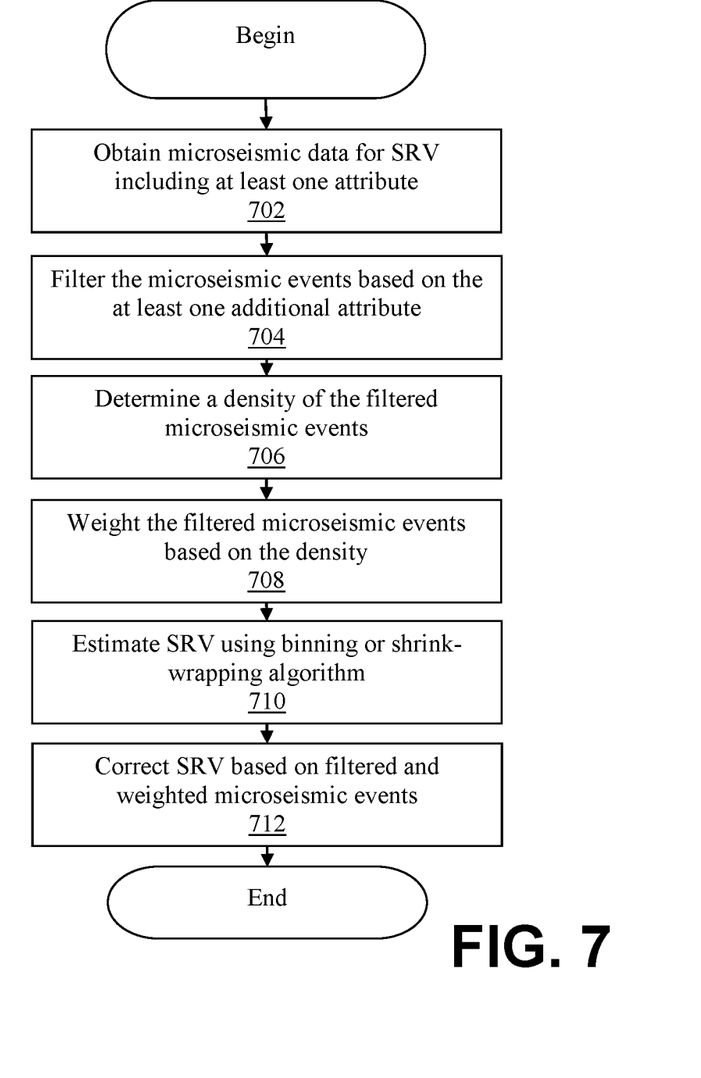
FIG. 7 is a flow diagram of an illustrative method for estimating stimulated reservoir volume by microseismic density mapping.

FIG. 7 is a flow diagram of an illustrative method of microseismic density mapping. At 702, microseismic data for the stimulated reservoir volume estimate is obtained including at least one additional attribute for each of the microseismic events. Examples of microseismic events include a hydraulic fracture opening, a secondary fracture opening off of the main fracture, a leak off of fluid into natural fractures, a discontinuity of the formation, a formation stress indicator, and the like. Location information is determined, along with additional attributes such as amplitude, location error, volume, volume change, energy, frequency, mode of failure, displacement and crack face normal vector orientations, and the like. As used herein, the term "additional attributes" of a microseismic event does not include the location of the event. For clarity, one or two additional attributes will be used as examples in the following discussion, however, any number of additional attributes may collected and processed simultaneously for each of the microseismic events. The microseismic data may be obtained at one or more processors in various embodiments.

At 704, the microseismic events are filtered based on one or more additional attributes. In at least one embodiment, filtering the microseismic events includes selecting microseismic events for further processing if values of the one or more additional attributes are above or below filtering thresholds. For example, a microseismic event may be selected for further processing if a volume change of the event is above a threshold such as fifty percent of the average volume change. As another example, a microseismic event may be selected for further processing if amplitude of the event is above a threshold, such as seventy percent of the total average, and a correlation coefficient of the event is above a threshold such as 0.9/1.0. Similarly, multiple filter conditions can be implemented using Boolean logic (AND, OR, etc.) to simultaneously filter based on any number of additional attributes. The filtering conditions and thresholds may be adjusted as desired.

Figure 8:
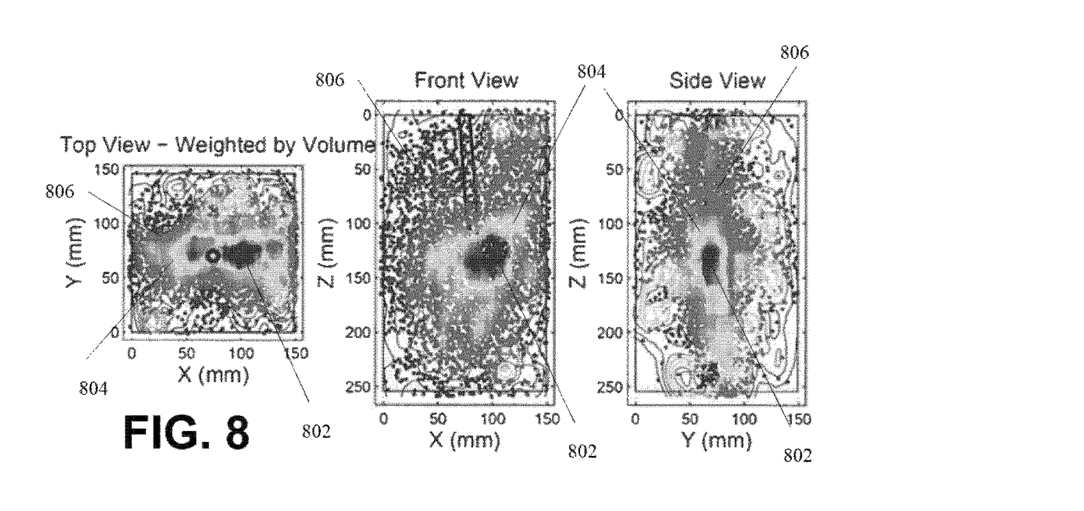
FIG. 8 is a density map of an illustrative additional attribute of microseismic events.

At 706, a density of the filtered microseismic events is determined. Determining the density may include determining whether a threshold number of filtered microseismic events lie within a threshold area. If no set of filtered microseismic events meets the criteria, the thresholds may be adjusted incrementally until one or more subsets of filtered microseismic events meet the criteria. These subsets may be assigned a first weight at 708. For example, FIG. 8 illustrates the density of microseismic events filtered by volume change. The darkly-shaded microseismic events 802 in the center of the three views may be assigned a first weight. Depending on the characteristics of the formation, the subsets assigned a first weight (or second or greater weight discussed below) can appear in multiple positions throughout the formation.

Next, it may be determined that a second number of filtered microseismic events are within a second threshold area. The second threshold number and threshold area may be larger than the first threshold number and first threshold area because it may be inclusive of the first threshold number and first threshold area. The microseismic events included in these second subsets that are not included in the first subsets may be assigned a second weight at 708. For example, the lightly-shaded microseismic events 804 surrounding the first subsets 802 may be assigned a second weight. Similarly, the medium-dark microseismic events 806 form third subsets that may be assigned a third weight, etc. In this way, a density map of the filtered events within the formation may be created and output for display. For example, each microseismic event of a certain weight may be assigned one color for display. These density maps allow for insight into the reservoir especially with regard to the locations of pay zones. Additionally, the mapping of events according to different additional attributes, separately or simultaneously, using overlays and/or color coordination provides for intuitive visualization of complex concepts such as the relationships between additional attributes over time.

At 710, the SRV is estimated using a binning or shrink-wrapping algorithm described in Zimmer, "Calculating Stimulated Reservoir Volume (SRV) with Consideration of Uncertainties in Microseismic-Event Locations," Canadian Society for Unconventional Gas, CSUG/SPE 148610 (2011). SRV is the total volume of rock which has been fractured and is presumed to be permeably connected to the borehole, and the SRV may be estimated by defining the boundaries of the fracture and measuring the volume encompassed by the boundaries. A binning algorithm groups microseismic events into the same "bin" if the events are on the same plane perpendicular to the borehole. The outermost events (furthest from the borehole within a bin) define the boundaries of the SRV only if a certain number of events are located within the bin. A shrink-wrapping algorithm connects the outermost microseismic events (without regard to planes perpendicular to the borehole) to their nearest event neighbors with straight lines to form an enclosed three dimensional polygonal area that defines the boundaries of the SRV. Additional attribute data is not used in either algorithm, and both algorithms over-estimate the SRV even when clear location outliers are eliminated. The over-estimation occurs because not all of the observed microseismic events represent regions hydraulically connected to the borehole and some of these regions have a high permeability that would increase production.

At 712, the SRV estimate is corrected based on the density. For example, correction factors in the form of adjustable areas around a microseismic event may be applied to each event based on the weight given to the event. An event with a high weight may have a larger area around it included in the SRV, while an event with a low weight may have a smaller area around it included in the SRV. These outermost of these collective areas define the boundaries of the SRV, and the volume within the boundaries is measured to provide the SRV estimate. When applied to the outermost events, the correction factor may reduce the SRV if the outmost events are not associated with a high weight. Conversely, the correction factor may increase the SRV if the outermost events are associated with a high weight.

The areas associated with each weight may be adjusted as desired. Because the microseismic events are filtered, more microseismic events than clear outliers may be eliminated in the SRV estimate. Also, because the areas are adjustable based on the weight, a finely tuned SRV estimate is possible. Finally, because additional attributes may be processed separately or simultaneously to create the density map, particularly high-producing pay-zones may be identified to mitigate risk associated with decisions based on the SRV, e.g. the economic feasibility of extraction. In at least one embodiment, the SRV is estimated using the filtered and weighted microseismic events directly, instead of using the filtered and weighted events as correction factors. For example, an area surrounding each filtered and weighted microseismic event may be determined, and the collective areas may form the SRV.

FIG. 8 is a density map of volume change, i.e. the microseismic events were filtered to only show those with a high volume change (above a threshold) and weighted based on density. The darkly-shaded microseismic events 802 in the center of the three views are assigned a first weight and have a larger area around them included in the SRV. The lightly-shaded microseismic events 804 surrounding the first subsets 802 are assigned a second weight and have a smaller area around them included in the SRV. Note that events assigned a lower weight need not always surround events assigned a higher weight. Similarly, the medium-dark microseismic events 806 form third subsets that are assigned a third weight and have an even smaller area around them included in the SRV, etc.

Figure 9:
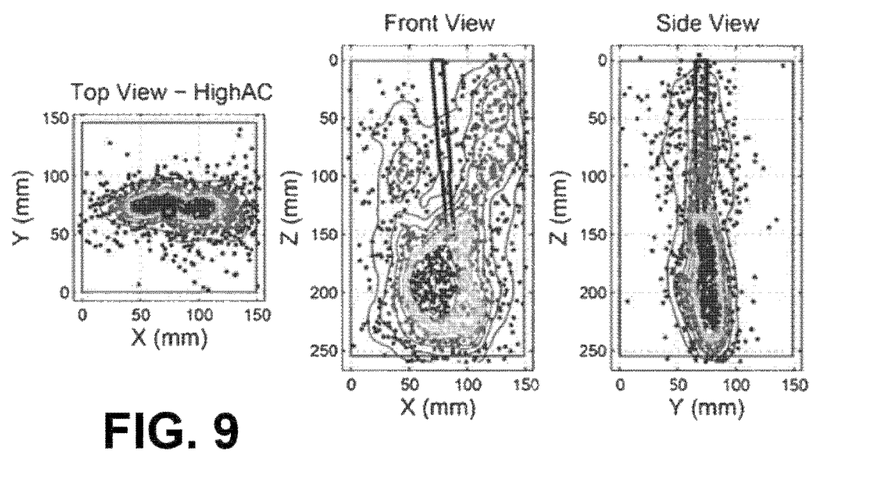
FIG. 9 is a density map of two illustrative additional attributes of microseismic events.

FIG. 9 is a density map of amplitude and correlation coefficient, i.e. the microseismic events were filtered to only show those with a high amplitude and high correlation coefficient, and weighted based on density. These density maps may be overlaid on an SRV estimate based on binning or shrink-wrapping to provide comparison information, may be used standing alone, may be used in combination with other maps, or may be put into motion to provide further insight.

A method includes fracturing a formation and collecting stimulated reservoir volume data including at least one additional attribute of each of a plurality of microseismic events within the formation. The method further includes determining a density of the at least one additional attribute within the formation. The method further includes estimating a stimulated reservoir volume using a binning or shrink-wrapping algorithm. The method further includes correcting the stimulated reservoir volume based on the density.

Determining the density may include determining whether a threshold number of the first subset of microseismic events is within a threshold area. Assigning each microseismic event a weight may include assigning a first subset of microseismic events based on the density of the first subset.

A non-transitory information storage medium includes instructions that, when executed, cause one or more processors to: receive stimulated reservoir volume data including at least one additional attribute of each of a plurality of microseismic events within a formation. The one or more processors are further caused to determine a density of the at least one additional attribute within the formation and output the density for display.

The one or more processors may be further caused to estimate a stimulated reservoir volume using a binning or shrink-wrapping algorithm and correct the stimulated reservoir volume based on the density. The at least one additional attribute may be selected from the group consisting of amplitude, location error, volume, volume change, energy, frequency, and mode of failure. Determining the density may cause the one or more processors to assign each microseismic event a weight based on a value of the at least one additional attribute of the microseismic event. Assigning each microseismic event a weight may cause the one or more processors to assign a first subset of microseismic events a first weight based on the value of the at least one additional attribute of the first subset being between two threshold additional attribute values. Determining the density may cause the one or more processors to determine whether a threshold number of the first subset of microseismic events is within a threshold area. Determining the density may cause the one or more processors to create a density map of the additional attribute within the formation and wherein outputting the density for display causes the one or more processors to output the density map for display.

A method includes: receiving stimulated reservoir volume data including at least one additional attribute of each of a plurality of microseismic events within a formation. The method further includes determining a density of the at least one additional attribute within the formation and providing the density.

The method may further include estimating a stimulated reservoir volume using a binning or shrink-wrapping algorithm and correcting the stimulated reservoir volume based on the density. The at least one additional attribute may be selected from the group consisting of amplitude, location error, volume, volume change, energy, frequency, and mode of failure. Determining the density may include assigning each microseismic event a weight based on a value of the at least one additional attribute of the microseismic event. Assigning each microseismic event a weight may include assigning a first subset of microseismic events a first weight based on the value of the at least one additional attribute of the first subset being between two threshold additional attribute values. Determining the density may include determining whether a threshold number of the first subset of microseismic events is within a threshold area. Determining the density may include creating a density map of the additional attribute within the formation and wherein outputting the density for display causes the one or more processors to output the density map for display.

While the present disclosure has been described with respect to a limited number of embodiments, those skilled in the art will appreciate numerous modifications and variations therefrom. It is intended that the appended claims cover all such modifications and variations.

What is claimed is:

1. A method of estimating stimulated reservoir volume of a formation, comprising:
    obtaining microseismic event data acquired during a hydraulic fracturing treatment of the formation, the data comprising event location and at least one additional attribute for each of a plurality of microseismic events within the formation;
    filtering the microseismic events based on the at least one additional attribute;
    determining a density of filtered microseismic events;
    weighting the filtered microseismic events based on the density; and
    determining a stimulated reservoir volume estimate based on filtered and weighted microseismic events.

2. The method of claim 1, wherein determining the density comprises determining that a first threshold number of filtered microseismic events are within a first threshold area.

3. The method of claim 2, wherein determining the density comprises determining that a second threshold number of filtered microseismic events are within a second threshold area, the second threshold number larger than the first threshold number and the second threshold area larger than the first threshold area.

4. The method of claim 3, wherein weighting the filtered microseismic events comprises assigning the first threshold number of filtered microseismic events a first weight and assigning the second threshold number of filtered microseismic events, not included in the first threshold number, a second weight, the first weight larger than the second weight.

5. The method of claim 1, wherein filtering the microseismic events comprises selecting microseismic events for further processing if values of the least one additional attribute for the microseismic events are above or below a filtering threshold.

6. The method of claim 5, wherein the at least one additional attribute comprises a first additional attribute and a second additional attribute, and wherein filtering the microseismic events comprises selecting microseismic events for further processing if values of the first additional attribute are above or below a first filtering threshold and values of the second additional attribute are above or below a second filtering threshold.

7. The method of claim 1, further comprising displaying the stimulated reservoir volume estimate.

8. The method of claim 1, further comprising storing the stimulated reservoir estimate on a non-transitory information storage medium.

9. The method of claim 1, wherein obtaining microseismic event data comprises:
    deploying sensors to collect raw microseismic event data;
    processing signals from the sensors to triangulate the event locations and measure the at least one additional attribute.

10. The method of claim 1, wherein the at least one additional attribute comprises volume.

11. The method of claim 1, wherein the at least one additional attribute is selected from the group consisting of amplitude, location error, volume, volume change, energy, frequency, and mode of failure.

12. A non-transitory information-storage medium comprising instructions for estimating stimulated reservoir volume of a formation that, when executed, cause one or more processors to:
    obtain microseismic event data acquired during a hydraulic fracturing treatment of the formation, the data comprising event location and at least one additional attribute for each of a plurality of microseismic events within the formation;
    filter the microseismic events based on the at least one additional attribute;
    determine a density of filtered microseismic events;
    weight the filtered microseismic events based on the density; and
    determine a stimulated reservoir volume estimate based on filtered and weighted microseismic events.

13. The medium of claim 12, wherein determining the density causes the one or more processors to determine that a first threshold number of filtered microseismic events are within a first threshold area.

14. The medium of claim 13, wherein determining the density causes the one or more processors to determine that a second threshold number of filtered microseismic events are within a second threshold area, the second threshold number larger than the first threshold number and the second threshold area larger than the first threshold area.

15. The medium of claim 14, wherein weighting the filtered microseismic events causes the one or more processors to assign the first threshold number of filtered microseismic events a first weight and assign the second threshold number of filtered microseismic events, not included in the first threshold number, a second weight, the first weight larger than the second weight.

16. The medium of claim 12, wherein filtering the microseismic events causes the one or more processors to select microseismic events for further processing if values of the least one additional attribute for the microseismic events are above or below a filtering threshold.

17. The medium of claim 16, wherein the at least one additional attribute comprises a first additional attribute and a second additional attribute, and wherein filtering the microseismic events causes the one or more processors to select microseismic events for further processing if values of the first additional attribute are above or below a first filtering threshold and values of the second additional attribute are above or below a second filtering threshold.

18. The medium of claim 12, wherein the one or more processors are further caused to output for display the stimulated reservoir volume estimate.

19. The medium of claim 12, wherein the at least one additional attribute comprises volume.

20. The medium of claim 12, wherein the at least one additional attribute is selected from the group consisting of amplitude, location error, volume, volume change, energy, frequency, and mode of failure.

* * * * *